(12) United States Patent
Fukui et al.

(10) Patent No.: US 6,340,427 B1
(45) Date of Patent: Jan. 22, 2002

(54) SOLUTION PURIFICATION METHOD FOR ELECTROLYTE

(75) Inventors: Atsushi Fukui; Kouji Ando; Masaki Imamura, all of Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 09/516,020

(22) Filed: Feb. 29, 2000

(30) Foreign Application Priority Data

Mar. 1, 1999 (JP) ......................................... H11-053203

(51) Int. Cl.$^7$ .................................................. C02F 1/46
(52) U.S. Cl. ...................... 205/688; 205/742; 210/661; 210/670; 210/676; 210/688
(58) Field of Search ................................ 210/661, 670, 210/676, 688; 205/742, 688

(56) References Cited

U.S. PATENT DOCUMENTS 5,066,371 A * 11/1991 Devoe et al. ............... 205/742

* cited by examiner

*Primary Examiner*—Arun S. Phasge
(74) *Attorney, Agent, or Firm*—Finnegan, Henderson, Farabow, Garrett & Dunner, L.L.P.

(57) ABSTRACT

A solution purification method for an electrolyte comprising the steps of dividing a chelate resin having a volume corresponding to the quantity of Sb and Bi to be adsorbed into a plurality of columns, bringing an electrolyte into contact with the chelate resin in the columns to adsorb the Su and Bi for removing, respectively, and subjecting a predetermined number of columns which have completed adsorption among the plurality of columns, to washing in turn, such that the columns are fed in series with a washing solution.

11 Claims, 7 Drawing Sheets

Drawings

Sb elution curves for a single column method and a continuous column method

SOLUTION PURIFICATION METHOD FOR ELECTROLYTE

TECHNICAL FIELD OF THE INVENTION

The present invention relates to a solution purification method for an electrolyte. More specifically the invention relates to a method of performing washing with sulfuric acid, elution and washing with water with respect to a chelate resin, when substances contained as impurities in a copper electrolyte used in an electrolytic copper refinery, specifically Sb and Bi are recovered using the chelate resin while the copper electrolyte is purified.

BACKGROUND OF THE INVENTION

If the concentration of impurities in the V group such as Sb, Bi exceeds a certain level in the electrolyte in copper electrolysis, the quality of an electrolytic copper as a product deteriorates, requiring solution purification of the electrolyte.

As one of these solution purification methods, there is a method of bringing the copper electrolyte into contact with a chelate resin which adsorbs Sb and Bi to thereby adsorb these. The method, normally known as the most common method for this, comprises the steps where a chelate resin is filled into one column in an amount corresponding to a required quantity to be removed, to adsorb Sb and Bi by feeding the copper electrolyte thereto, and after the chelate resin has been washed with water and then with sulfuric acid or the like which is substituted for the electrolyte, the chelate resin is brought into contact with an eluent.

When only one column is used for the operation, however, since the adsorption and elution operations are required alternately, and the solution feed rate and the time required for feeding are different for each operation, at least two columns must be prepared for continuous removal.

The removal quantity of the V group impurities is different according to the quality of impurities in the V group in the copper electrolyte anode, the eluted amount and the standard control concentration. In a normal electrolytic copper refinery, the removal quantity becomes several tons per month. These impurities in the V group are normally removed by electrolyte for removing copper in electrolytic drainage. If they are removed by using a chelate resin, several m$^3$ units of resin are required.

Moreover, with a conventional method using a chelate resin, the amount of the processing solution in the washing and elution processes increases/decreases according to the amount of resin, and the amount of the processing solution increases with the increase of the amount of resin. Hence, the solution storage tank or the like becomes large, and even if the operation for each processing is simple, there is a problem in that the equipment becomes large. Moreover, there are another problems in that pressure loss increases with an increase in the size of the column, and that the fed liquid flows in the column unevenly, thereby making it difficult to adsorb and elute a predetermined amount.

Moreover, if a required amount of the processing solution is fed in the washing and elution process, a low concentration solution is generated in a large quantity.

On the other hand, if the quantity of the processing solution is reduced, washing is insufficient, and there is a problem in that in the elution process thereafter, Cu may be mixed into the eluate flowing out of the chelate resin, or the eluate may be mixed into the copper electrolyte in the adsorption process. Hence, the quantity of the liquid to be fed cannot be reduced. Moreover, if the quantity of the processing solution is reduced, the peak concentration at the time of elution becomes only several grams/liter.

SUMMARY OF THE INVENTION

Therefore, an object of the present invention is to provide a solution purification method to achieve efficient removal of impurities, reduction of the processing solution and down-sizing of the equipment.

Another object of the present invention is to provide a solution purification method for a copper electrolyte which can effectively remove impurities with small-sized equipment.

Another object of the present invention is to provide a solution purification method for an electrolyte where Sb and Bi are efficiently adsorbed to a chelate resin, washing of the chelate resin and elution of Sb and Bi are efficiently performed, and the quantity of a washing processing solution is reduced, while an eluate containing high concentration Sb and Bi can be obtained.

Another object of the present invention is to provide a solution purification method for an electrolyte where water washing can be omitted.

DETAILED DESCRIPTION OF THE PREFERRED EMBODIMENTS

Figure 1:
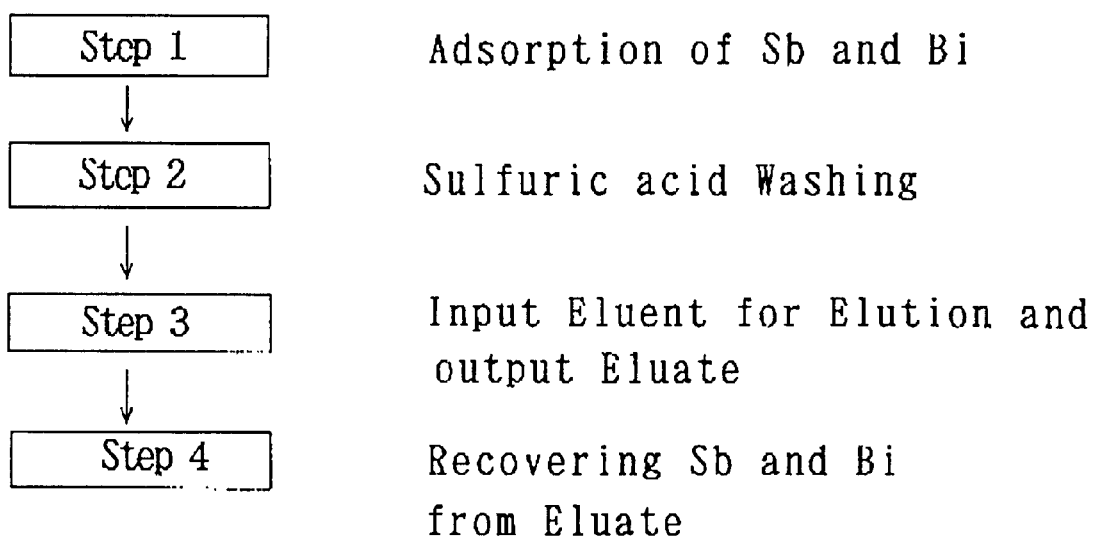
FIG. 1 is a flow chart to show a process for recovering Sb and Bi from copper electrolyte.

With one feature of the present invention, a chelate resin which can adsorb Sb and Bi is brought into contact with a copper electrolyte to adsorb Sb and Bi. Then at the time of recovering Sb and Bi from the chelate resin, chelate resin having a predetermined volume required for recovering Sb and Bi is subdivided into a plurality of columns and the copper electrolyte is fed in parallel to the columns to adsorb Sb and Bi.

After a chelate resin which can adsorb Sb and Bi has been brought into contact with a copper electrolyte to adsorb Sb and Bi contained in the copper electrolyte, and before Sb and Bi are eluted and recovered from the chelate resin, a dilute water solution of sulfuric acid, preferably a water solution of sulfuric acid having a pH equal to or below 0 is fed from the top portion of the columns. Thereby, the chelate resin is washed efficiently by utilizing the difference in specific gravity to the electrolyte, without mixing the water solution of sulfuric acid with the copper electrolyte. The water solution of sulfuric acid used here for washing has preferably a concentration of sulfuric acid of from 20 to 200 g/l. In particular, if the concentration of sulfuric acid is from 100 to 200 g/l, it is easy to maintain the pH at 0 or below. The washing temperature is preferably from 40 to 50° C.

In the following examples of the present invention, a plurality of columns were prepared in parallel, a chelate resin in a specified volume required for adsorbing and removing Sb and Bi is subdivided to these columns, and a specified volume of copper electrolyte is separately fed to and brought into contact with the chelate resin disposed in the parallel columns to thereby adsorb Sb and Bi. The specified volume of the chelate resin is determined depending upon the specified volume of copper electrolyte. In other words, the quantity of the required processing solution is stipulated so as to feed so many times the resin quantity. Normally this is expressed in BV. If the resin quantity is constants the overall liquid quantity is the same either with a single column or with a plurality of columns.

Below is a description of an adsorption mechanism with a single column.

When a copper electrolyte is fed to the column, as the copper electrolyte flows in the column, Sb and Bi are adsorbed by the chelate resin in the column. Since the copper electrolyte is fed from the top of the column, adsorption of Sb and Bi begins from the upper part of the column. Therefore, at the initial stage of feeding, the concentration of Sb and Bi becomes lower in the copper electrolyte flowing in the lower part of the column than in the copper electrolyte flowing in the upper part of the column. This is because the Sb and Bi have already been adsorbed in the upper part of the column. The adsorption equilibrium property of the chelate resin is such that the adsorption quantity increases in a high concentration, and decreases in a low concentration. Therefore, the chelate resin in the vicinity of the column outlet where the copper electrolyte containing Sb and Bi in an amount of almost 0 is discharged hardly adsorbs any Sb and Bi. As feeding proceeds, the chelate resin existing in the lower part below the upper part of the column sequentially adsorbs Sb and Bi. Then, at the last stage of feeding, the chelate resin in the vicinity of the column outlet also adsorbs Sb and Bi up to a saturation state. At this time, since the chelate resin in the vicinity of the column inlet has already been saturate with Sb and Bi, it has no adsorption capacity, and the copper electrolyte only passes through and no adsorption is effected. Therefore, at the last stage of feeding, efficient adsorption is not performed in the vicinity of the column inlet. Such a deviation of adsorption is conspicuous in a column having a large volume.

Moreover, in the vicinity of the column outlet, the flow of copper electrolyte tends to converge. Hence, even when the chelate resin near the column outlet becomes saturate with Sb and Bi, a chelate resin portion capable of adsorption remains unutilized in the vicinity of the converging flow. This unutilized portion tends to become large in a column having a large volume or having an oblong shape.

In this example, by subdividing the conventional single columns and feeding in parallel, more Sb and Bi can be adsorbed than a case where the same amount of chelate resin is fed to a single column. Conversely speaking, if it is assumed that the adsorption removal quantity by means of the chelate resin is constant, the required specified quantity of the chelate resin can be reduced.

Examples of tie present invention will now be described for a case where a single column is subdivided into five columns.

EXAMPLE 1

500 ml of powdery chelate resin (Duolite C-467) was subdivided into 100 ml and filled into the five columns, and a copper electrolyte was fed to respective columns, so that Sb and Bi were adsorbed by the chelate resin. The copper electrolyte used contained Cu in an amount of 50 g/l, sulfuric acid in an amount of 200 g/l, Sb in an amount of 0.5 g/l, and Bi in an amount of 0.3 g/l. The adsorption conditions were such that the adsorption temperature was 60° C., and feeding was performed up to BV50 (50 liters per 1 liter of resin) at a feed rate of SV10 (10 liters/hour per 1 liter of resin) with respect to the aforesaid five columns. The overall liquid quantity was the same at 2.5 liters. The obtained results are shown in Table 1.

Comparative Example 1

500ml of powdery chelate resin Duolite C-467) was filled into a single column, and a copper electrolyte was fed thereto, so that Sb and Bi were adsorbed by the chelate resin. The feeding conditions were the same as those of Example 1.

TABLE 1

|  | (Example 1) Average of Five Columns | | (Comparative Example 2) Single Column | |
| --- | --- | --- | --- | --- |
|  | Sb | Bi | Sb | Bi |
| Concentration of Original Liquid g/l | 0.49 | 0.29 | 0.49 | 0.29 |
| Concentration of Liquid after Adsorption g/l | 0.25 | 0.24 | 0.25 | 0.10 |
| Amount g of Adsortion (All of Five) | 9.38 | 4.37 | 7.41 | 4.38 |
| Amount g of Adsorption/ resin 1 | 18.76 | 8.74 | 14.82 | 8.77 |

From the above Table 1, it is seen that even with the same liquid quantity, more adsorption can be performed by filling a chelate resin into five subdivided columns than in the case where the chelate resin is filled into a large single column.

EXAMPLE 2

500 ml of powdery chelate resin (Duolite C-467) was subdivided into 100 ml and filled into five columns, and a copper electrolyte was fed to respective columns disposed in parallel, so that Sb and Bi were adsorbed by the chelate resin. The absorption conditions were the same as in Example 1, except that the feed quantity was 15 liters. The obtained results are shown in Table 2. Respective columns were separately eluted and the eluted quantity was designated as the adsorption quantity.

Comparative Example 2

500ml of powdery chelate resin (Duolite C-467) was subdivided into 100 ml and filled into the five columns, and a copper electrolyte was fed to respective columns disposed in series, so that Sb and Bi were adsorbed by the chelate resin. The adsorption quantity of each column (g/resin 1) is shown in Table 2.

TABLE 2

| | (Comparative Example 2) Five in Series | | (Example 2) Five in Parallel | |
|---|---|---|---|---|
| Column | Sb g/l | Bi g/l | Sb g/l | Bi g/l |
| 1 | 18.76 | 8.74 | 18.90 | 8.80 |
| 2 | 15.96 | 8.32 | 19.00 | 9.00 |
| 3 | 15.14 | 7.83 | 18.85 | 8.74 |
| 4 | 11.06 | 7.46 | 18.66 | 8.68 |
| 5 | 9.47 | 6.67 | 18.76 | 8.64 |
| Average | 14.08 | 7.80 | 18.83 | 8.77 |

From the above Examples, it is seen that more effective adsorption can be effected with the copper electrolyte in the same quantity by disposing the five columns in parallel than in the case where the five columns are disposed in series to adsorb Sb and Bi. Moreover, it can be said that when the five columns are coupled in series, the adsorption quantity is smaller than for the case where the same volume of chelate resin is fed to a single column without subdivision.

Therefore, as described above, in the Example, adsorption of Sb and Bi by means of the chelate resin can be more efficiently performed than for the case in the comparative example.

A process for the case where a water solution of sulfuric acid having a relatively high concentration is used for washing the chelate resin will now be described with reference to FIG. 1.

A chelate resin that can adsorb Sb and Bi is brought into contact with a copper electrolyte to adsorb Sb and Bi (Step 1).

To wash the chelate resin which has adsorbed Sb and Bi, water solution of sulfuric acid having a pH of 0 or below is fed from the upper part of a column to which the chelate resin is filled (Step 2).

The concentration of sulfuric acid in the water solution of sulfuric acid in Step 2 is to be from 100 to 200 g/l.

After washing, in order to prevent the eluent (hydrochloric acid) and the water solution of sulfuric acid from mixing, the eluent is fed from the bottom of the column, to thereby push up the water solution of sulfuric acid by utilizing the difference in specific gravity so that the eluent is not diluted by the water solution of sulfuric acid, to effect elution of Sb and Bi remaining in the resin (Step 3).

Sb and 13i are recovered from the eluate after elution (Step 4).

In addition, the chelate resin after elution is washed and reused.

In Step 2, the chelate resin is directly subjected to the sulfuric acid washing, hence sufficient washing can be performed, and a step for washing with water can be omitted. However, sometimes the concentration or Cu in the eluate is higher than the final concentration of the washing solution comprising 20 to 30 g/l of water solution of sulfuric acid conventionally used for washing.

Therefore, the inventors considered that Cu which has been considered to be adhered to the chelate resin is actually adsorbed thereby. Therefore, the present inventors have studied the influence of pH of Copper electrolyte with respect to adsorption of Cu by the chelate resin. As a result, it was found that Cu in a copper electrolyte having a pH of 0 or below was not adsorbed, but Cu in a copper electrolyte having a pH of 2 or higher was adsorbed. The inventors considered that since the pH of a water solution of sulfuric acid in an amount of 20 g/l to 30 g/l was from 0 to 1, the pH of the copper electrolyte partly diluted with the washing solution increased, and hence Cu was adsorbed by the chelate resin. Hence, when the chelate resin was washed with a water solution of sulfuric acid having a high concentration of sulfuric acid, that is, having a pH of 0 or below, good results were obtained, and the Cu concentration in the eluate could be largely decreased.

EXAMPLE 3

To confirm the relation between adsorption of Cu and the pH, a solution of copper sulfate was prepared to have a pH of from 0 to 3, and the adsorption quantity when 1000 ml of the solution of copper sulfate was brought into contact with 20 ml of a chelate resin (Duolite C-467) in a batch method was compared. The adsorption conditions were Cu: 50 g/l, adsorption temperature: 60° C., adsorption time: 60 minutes, and this was stirred with a stirrer. The adsorption quantity was determined by elution after adsorption. That is to say, elution was effected while stirring an eluent containing 2.5 moles of sulfuric acid and sodium chloride, respectively, with a stirrer at 45° C. for 60 minutes.

The concentration of Cu in the eluate after elution and the quantity of elution are shown in Table 3.

TABLE 3

| pH | Concentration of Cu g/l | Amount of Elution g/Resin 1 |
|---|---|---|
| 0 | 0.075 | 0.75 |
| 1 | 0.45 | 4.50 |
| 2 | 1.48 | 14.80 |
| 3 | 2.13 | 21.30 |

From the above Example, it is seen that the concentration of Cu in the eluate increases with increase of pH, hence Cu is adsorbed by the chelate resin from the solution of copper sulfate with higher pH.

EXAMPLE 4

To 100 ml of chelate resin (Duolite C-467) filled into the column was fed 10 liters of copper electrolyte, so that Sb and Bi were adsorbed by the chelate resin. The electrolyte used contained Cu in an amount of 50 g/l, sulfuric acid in an amount of 200 g/l, Sb and Bi in an amount of 0.5 g/l. The adsorption conditions were such that the adsorption temperature was maintained at 60° C., and feeding was performed up to BV100 (100 liters per 1 liter of resin) at a feed rate of SV10 (10 liters/hour per 1 liter of resin). Then, in order to wash the chelate resin, 100 g/l of sulfuric acid solution of about 50° C. was fed to the column from the upper part of the column at a feed rate of SV5 up to the amount of BV5. Thereafter, a mixed solution of sulfuric acid and sodium chloride of about 50° C. was fed from the lower part of the column at a feed rate of SV5 up to the amount of BV5, and Sb and Bi were eluted without being mixed with the sulfuric acid solution. The elution results are shown in Table 5.

EXAMPLE 5

Washing and elution were performed under the same conditions as in Example 4 except that 200 g/l of sulfuric acid solution of about 50° C. was used for washing the chelate resin. The elution results are shown in Table 5.

Comparative Example 3

The elution results after washing with 30 g/l of water solution of sulfuric acid as conventionally performed are shown in Table 6.

TABLE 4

| | Concentration of Cleaning Liquid | | | | Concentration of Eluate | | |
|---|---|---|---|---|---|---|---|
| BV | Sb g/l | Bi g/l | Cu g/l | BV | Sb g/l | Bi g/l | Cu g/l |
| 2 | 0.082 | 0.024 | 1.50 | 2 | 1.19 | 1.81 | 0.19 |
| 3 | 0.009 | 0.011 | 0.34 | 3 | 3.80 | 0.92 | 0.15 |
| 4 | 0.066 | 0.008 | 0.21 | 4 | 2.31 | 0.66 | 0.082 |
| 5 | 0.061 | 0.006 | 0.094 | 5 | 1.57 | 0.47 | 0.095 |
| Average | 0.07 | 0.01 | 0.54 | 6 | 1.10 | 0.35 | 0.033 |
| | | | | 7 | 0.49 | 0.10 | 0.028 |
| | | | | Average | 2.24 | 0.73 | 0.096 |

TABLE 5

| | Concentration of Cleaning Liquid | | | | Concentration of Eluate | | |
|---|---|---|---|---|---|---|---|
| BV | Sb g/l | Bi g/l | Cu g/l | BV | Sb g/l | Bi g/l | Cu g/l |
| 2 | 0.13 | 0.098 | 1.66 | 2 | 3.78 | 1.38 | 0.16 |
| 3 | 0.12 | 0.070 | 0.27 | 3 | 3.63 | 0.98 | 0.11 |
| 4 | 0.11 | 0.062 | 0.11 | 4 | 1.96 | 0.53 | 0.056 |
| 5 | 0.11 | 0.056 | 0.092 | 5 | 1.30 | 0.48 | 0.046 |
| Average | 0.12 | 0.07 | 0.53 | 6 | 0.85 | 0.31 | 0.034 |
| | | | | 7 | 0.65 | 0.22 | 0.032 |
| | | | | Average | 2.03 | 0.65 | 0.073 |

TABLE 6

| | Concentration of Eluate | | |
|---|---|---|---|
| BV | Sb g/l | Bi g/l | Cu g/l |
| 2 | 3.04 | 2.21 | 0.49 |
| 3 | 13.50 | 3.27 | 0.20 |
| 4 | 5.76 | 0.89 | 0.09 |
| 5 | 2.81 | 0.29 | 0.06 |
| 6 | 1.53 | 0.10 | 0.05 |
| 7 | 0.87 | 0.03 | 0.05 |
| Average | 4.57 | 1.13 | 0.16 |

From the above Example, it is seen that the average concentration of Cu in the eluate can be made not higher than 0.1 g/l, by washing with a sulfuric acid solution in an amount of from 100 to 200 g/l. Moreover, since there is no big difference between the amount of 100 g/l and 200 g/l, it can be said that washing and elution could be performed with 100 g/l of sulfuric acid solution without any problem.

Since the present invention is constructed as described above, the average concentration of Cu in the eluate which flows out of the chelate resin after having absorbed Sb and Bi can be made 0.1 g/l or below.

A process in the case where a dilute water solution of sulfuric acid is used for washing will now be described with reference to FIG. 1.

To a column in which a chelate resin which can adsorb Sb and Bi has been filled, a copper electrolyte containing Sb and Bi is fed to bring the copper electrolyte into contact with the chelate resin so that Sb and Bi in the copper electrolyte are adsorbed by the chelate resin (Step 1).

To wash the chelate resin which has adsorbed Sb and Bi, a dilute water solution of sulfuric acid is fed from the upper part of the column in which the chelate resin has been filled to thereby force out the copper electrolyte and to effect washing (Step 2).

The concentration of sulfuric acid in the water solution of sulfuric acid in Step 2 is to be from 20 to 30 g/l.

After washing, if hydrochloric acid is used as an eluent, in order to prevent the water solution of sulfuric acid from mixing therewith, after the water solution of sulfuric acid in the column is pushed up with water introduced from the bottom of the column, the eluent is fed from the bottom of the column, to thereby push up the water in the column by utilizing the difference in specific gravity with water (Step 3). Thereby, Sb and Bi remaining in the chelate resin are eluted while the eluent is not diluted with water.

When a sulfuric acid type eluent is used, since mixing in a small amount does not have any problem, washing with water with respect to sulfuric acid in the column is omitted.

Sb and Bi are recovered from the eluate after elution according to the conventional art (Step 4).

Conventionally, in the washing step, washing with water has been performed before washing with sulfuric acid prior to elution. On the contrary, the present inventors have found that chelate resin can be sufficiently washed by direct washing with sulfuric acid as shown in Step 2, and a step for washing with water can be omitted. Hence, it is considered that the burden on the waste water treatment process can be reduced. Moreover, by feeding the eluent from the bottom of the column, elution can be performed without the water solution of sulfuric acid for washing and the eluent being mixed.

EXAMPLE 6

To 100 ml of chelate resin (Product name: Eporus MX-2, produced by Miyoshi Oil & Fat Co.) filled into the column was fed 20 liters of copper electrolyte, so that Sb and Bi were adsorbed by the chelate resin. As the electrolyte, one containing Cu in an amount or 50 g/l, sulfuric acid in an amount of 200 g/l, Sb and Bi in an amount of 0.4 g/l each was used. The adsorption conditions were such that the adsorption temperature was 60° C., and feeding was performed up to BV200 (feed quantity of 200 liters per 1liter of resin) at a feed speed of SV10 (10 liters/hour per 1 liter of resin). Water washing was omitted for this column, and sulfuric acid solution was directly fed from the upper part of the column to effect washing, and an eluent consisting of sulfuric acid and sodium chloride was fed similarly from the lower part of the column to effect elution.

Comparative Example 4

Similar to the Example 6, to 100 ml of chelate resin (Product name: Eporus MX-2, produced by Miyoshi Oil & Fat Co.) filled into a column was fed 20 liters of copper electrolyte, so that Sb and Bi were adsorbed by the chelate resin. The electrolyte used contained Cu in an amount of 50 g/l, sulfuric acid in an amount of (of 200 g/l, Sb and Bi in an amount of 0.4 g/l. The adsorption conditions were such that the adsorption temperature was 60° C., and feeding was performed up to BV200 (feed quantity or 200 liters per 1 liter of resin) at a feed speed of SV10 (10 liters/hour per 1 liter of resin).

Then, in order to wash the copper electrolyte, pure water of about 50° C. was fed to the column from the upper part of the column up to BV7 (feed quantity of 7 liters per 1 liter of resin) at a feed speed of SV3 (3 liters/hour per 1 liter of resin), and thereafter, 30 g/l of sulfuric acid solution of about 50° C. was fed to the column from the bottom part of the column up to BV3 (feed quantity of 3 liters per 1 liter of resin) at a feed speed of SV1 (1 liter/hour per 1 liter of resin), so that dilution with water was not caused. Thereafter, an eluent consisting of sulfuric acid solution and sodium chloride was fed from the bottom part of the column, to thereby perform elution without being mixed with the sulfuric acid solution.

The results of washing without water washing (Example 6) were compared with the those of washing with water washing (Comparative Example 4). The eluent was a mixed solution of sulfuric acid and sodium chloride in an amount of 2.5 moles each, the elution temperature was about 50° C., and feeding was performed up to BV10 (feed quantity of 10 liters per 1 liter of resin) at a feed speed of SV1 (1 liter/hour per 1 liter of resin). The specific gravity of the copper electrolyte, sulfuric acid solution and the eluent were 1.26, 1.03 and 1.23, respectively. The obtained results are shown in Table 7.

TABLE 7

| | unit: g/l | | | |
|---|---|---|---|---|
| | (Comparative Example 4) with Water Washing | | (Example 6) without Water Washing | |
| End Concentration of Copper with water washing after Adsorption | 0.01 | 0.01 | — | — |
| Concentration of Copper in Water Liquid with Sulfuric Acid | 0.15 | 0.10 | 0.10 | 0.19 |
| Concentration of Copper in Eluate | 0.09 | 0.10 | 0 11 | 0.13 |

In another feature of the present invention, a chelate resin having a volume corresponding to the quantity of substances to be adsorbed is divided into a plurality of columns, an electrolyte is brought into contact with the chelate resin to thereby adsorb and remove the aforesaid substances, a predetermined number of columns which have completed adsorption among the plurality of columns are subjected to a washing process in turn, the columns in the washing process being fed in series with a washing solution. In addition, in the washing process, washing with sulfuric acid, elution and washing with water are performed.

In the adsorption process on the upstream side, a predetermined number of columns are grouped, and at the point in time after a liquid quantity obtained by dividing the feed quantity required for adsorption per column by the predetermined number, has been fed into each column, the columns are moved to the washing process on the downstream side.

In this adsorption process, the liquid quantity obtained by dividing the feed quantity required for adsorption per one column by the predetermined number, is fed in parallel to each column. In this case, it is preferred that each column is positioned in the adsorption process sequentially over a number of batches equivalent to the predetermined number, and the liquid quantity obtained by dividing the feed quantity required for adsorption per one column by the predetermined number, is fed for each batch.

On the other hand, when respective processes of washing with sulfuric acid, elution and washing with water are performed from the upstream side toward the downstream side, then in each process, the feed quantity required for one column is divided by the predetermined number, and at the time of having fed the divided feed quantities to each column in series, the columns are moved sequentially toward the downstream side.

That is to say, two or more columns which have completed the adsorption process are first arranged in series in a required number. Then a sulfuric acid washing solution is fed to these columns in series, and the columns to be fed are moved toward the downstream side and changed over, while keeping the total number of columns constant.

Then, two or more columns which have completed washing with sulfuric acid are arranged in series in a required number, eluent is fed to these columns in series, and the columns to be fed are moved toward the downstream side and changed over, while keeping the total number of columns constant.

In addition, two or more columns which have completed the elution process are arranged in series in a required number, a washing solution is fed to these columns in series, and the columns to be fed are moved toward the downstream side and changed over, while keeping the total number of columns constant.

With the present invention, it is possible to arrange in series a number of columns required for each operation of adsorption, washing with sulfuric acid, elution and washing with water, and divide a necessary amount of resin into a plurality of columns to thereby perform each process simultaneously, and these operations can be performed, designating the time when the first column has completed all processes as one cycle.

In the elution and washing processes, of the liquid discharged from the columns after being fed, by utilizing a solution from a previous process remaining in the column as a replenisher for the next cycle, the quantity of each processing solvent to be newly replenished can be economized.

The feed rate to the column and the feed quantity are normally expressed as SV and BV. That is to say, at SV20, BV100 means that the solution is fed at a feed rate of 20 times that of the resin quantity per hour, up to a feed quantity 100 times that of the resin quantity. For example, when the resin quantity is 100 ml, the feed quantity is 10 liter at a feed rate of 2 liter per hour, that is, feeding for 5 hours. Moreover, when the resin quantity is 200 ml, the feed quantity is 20 liter at a feed rate of 4 liter per hour, that is, feeding for 5 hours. Therefore, even with the same BV, the feed quantity changes in proportion to the resin quantity.

The feeding operation for washing the chelate resin in the solution purification method of a copper electrolyte according to the present invention will now be described with reference to FIG. 2, in the case where the total number of columns is 10.

A basic feeding method in the adsorption process performed prior to the chelate resin washing process is such that ten columns are arranged in parallel, and electrolyte is equally divided and fed, to thereby adsorb substances such as Sb, Bi and the like as impurities.

Figure 2:
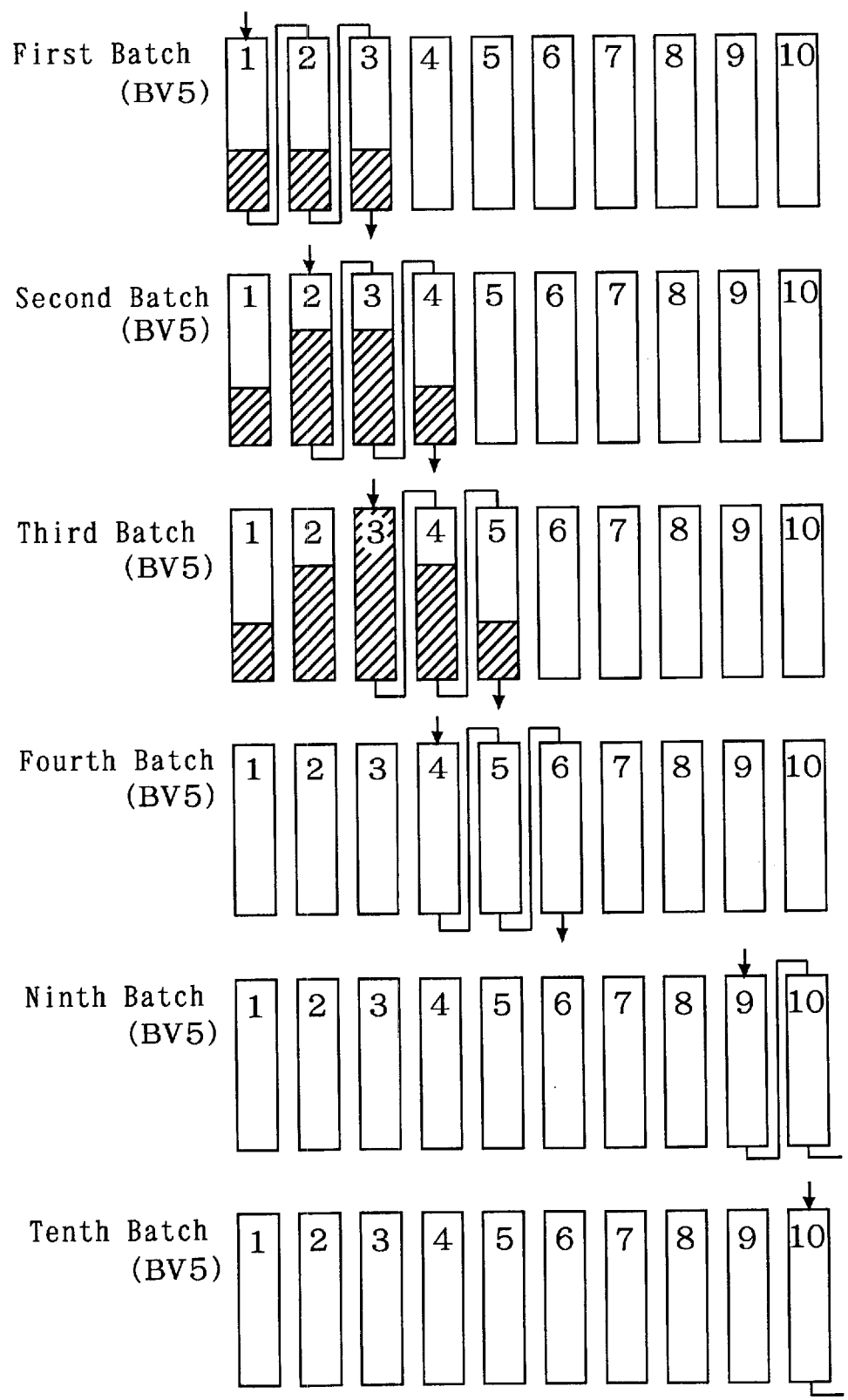
FIG. 2 is a schema showing a process in which the total number of columns is ten, a predetermined number is made three, and after the columns are fed in series, the columns are changed.

Then, assuming that the predetermined number of columns which are to be subjected to the chelate resin washing process, for example washing with sulfuric acid is three, then as shown in FIG. 2, in the first batch, a sulfuric acid washing solution is fed to the first column, and discharged from the third column. In this case, a supply apparatus for the sulfuric acid washing solution may be moved toward the first column, and a discharge apparatus may be moved toward the third column, or the first column may be moved toward the supply apparatus for the sulfuric acid washing solution and the third column may be moved toward the discharge apparatus.

Upon completion of feeding of the sulfuric acid washing solution in a predetermined amount (in this case, one third of the amount required for washing for one column), then in the next batch (second batch), the columns are respectively moved toward the downstream side, and the sulfuric acid washing solution is fed to the second column, and discharged from the fourth column. In addition, the first column moves out of the process. In this manner, columns are sequentially moved toward the downstream side of the next process through a plurality of batches, to thereby change the columns to be fed.

Here, if it is assumed that the liquid quantity required for washing one column is BV15, then with the liquid feeding method of the present invention, the feed quantity per one batch becomes a liquid quantity obtained by dividing the BV15 by three, which is the predetermined number, that is, BV15/3=BV5. If the first batch is fed such that the solution is fed from the first column and discharged from the third column, the feed quantity of the third column becomes BV15 at the third batch.

The feed method of the present invention is a method in which once feeding is started, it is possible to recover endlessly, and the feed quantity is insufficient only at the time of starting the feed, (the first column in the second batch, and the first and second columns in the third batch).

Therefore, if it is necessary to make up the insufficient quantity at the time of starting the feed, then prior to the above first batch, solution is supplied from the first column and BV5 is discharged from the first column. Then, the solution is supplied again to the first column and BV5 is discharged from the second column. Then, proceeding to the first batch, as described above, the solution is supplied to the first column and BV5 is discharged from the third column, after which the processing continues. With this additional process, the problem of the insufficient liquid quantity can be solved. Normally, however, since this is continuous solution purification, it is sufficient to wait until the operation becomes stable without worrying about insufficient feed quantity just after starting of the operation.

Conventionally, with washing and elution with one column (hereinafter referred to as a "single column"), if the required quantity of liquid is fed in each process, the efficiency of each processing is low, so that a solution containing substances such as Sb, Bi and the like with low concentration is generated in a large amount. On the contrary, with the present invention, the column is divided into a plurality of columns, and a predetermined number of columns are arranged in series and fed with a processing solvent. That is to say, it has been found that by only feeding a processing solution containing substances such as Sb, Bi and the like in low concentrations to the next column in series, sufficient elution and washing can be effected, and as a whole, the quantity of the processing solution can be reduced. With this method, the equipment can be made small, and the burden on a waste water treatment process can be reduced.

Next is a description of another embodiment or the present invention.

The washing process for the chelate resin comprises each process from washing with sulfuric acid on the upstream side through elution, to washing with water on the downstream side. Here, assuming that the total number of columns is 24, the liquid feed method in which washing with sulfuric acid, elution and washing with water are performed continuously in accordance with the present invention will be described with reference to FIG. 3.

Since this method comprises the above described four processes, the predetermined number of columns entering into each process is 6 respectively, and only the adsorption process is fed in parallel, and the other processes are fed in series, and the columns are changed over each hour.

The required feed quantity BV per one column in each process of washing with sulfuric acid, elution and washing with water is made 18. The feed quantity per one batch in the processes in which feeding is preformed in series is a liquid quantity obtained by dividing the required feed quantity BV per one column by the predetermined number of columns in each process, that is, BV18/6 giving BV3 per one batch.

Adsorption Zone

When Sb and Bi are adsorbed in the chelate resin, 6 columns of the 24 columns are fed and adsorbed separately in parallel. If it is assumed that the required feed quantity BV per one column is 120, the feed quantity BV per one batch becomes 120/6, that is, BV20.

Figure 3:
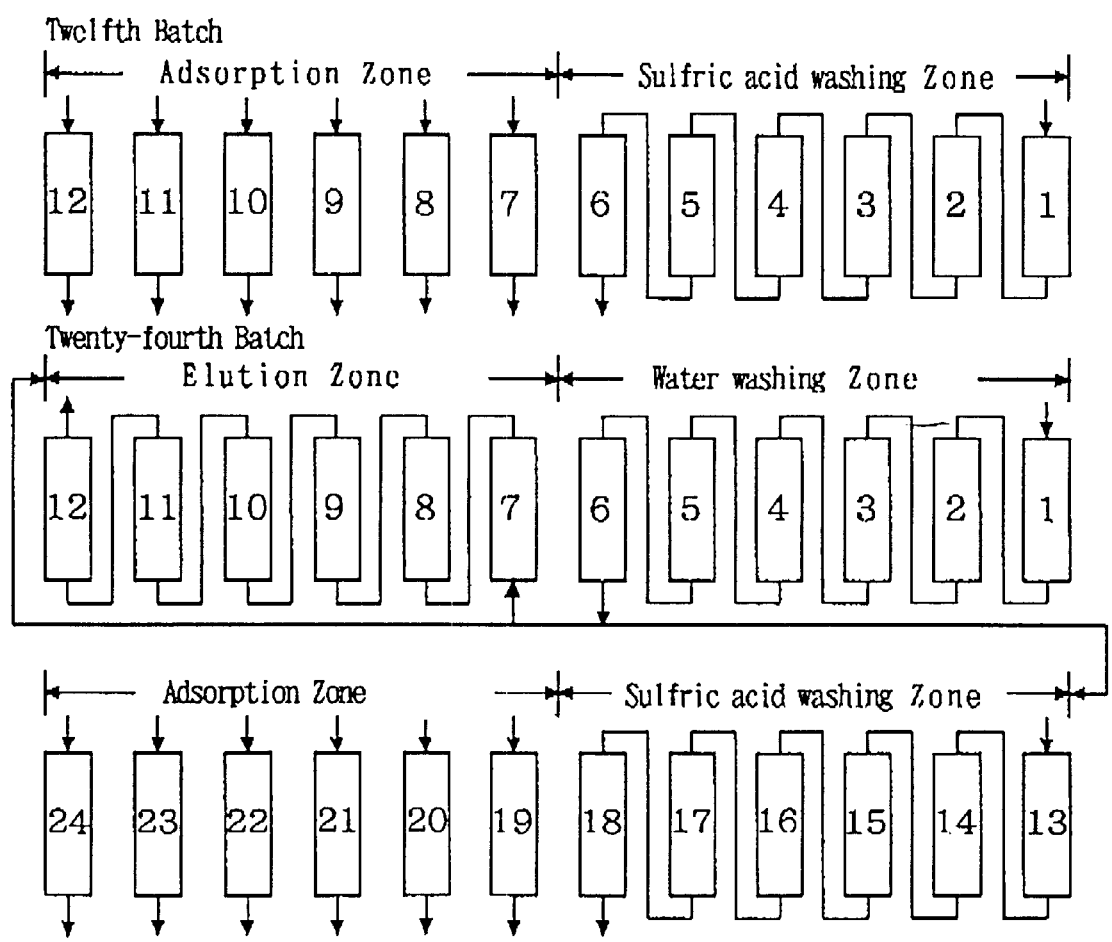
FIG. 3 is a schema showing a method for continuously performing each process according to the present invention.

Supply may be performed in parallel simultaneously to the 6 columns, or may be performed together with the next process such that the required feed quantity per one column is fed at the first batch, and is sequentially fed over the 6 batches. The twelfth batch in FIG. 3 shows the condition where, over the first batch through to the twelfth batch, all of the first column to the sixth column have sequentially gone through the adsorption process in the six batches and into the sulfuric acid washing process. The twelfth column has come into the adsorption process and the first column has already gone through the sulfuric acid washing process of the sixth batch. In addition, in the twenty fourth batch in FIG. 3, the twenty fourth column has come into the adsorption process.

Sulfuric Acid Washing Zone

To wash the chelate resin with sulfuric acid after adsorption, sulfuric acid aqueous solution is fed to six columns coupled in series and the columns washed. Supply may be performed in one batch such that all the required quantity is fed to the six columns, but it is preferred that the required quantity be divided into 6 batches and one column be moved toward the downstream side for each batch. For example, as described above, when each column is subjected to the adsorption process sequentially over six batches, then from the seventh batch to the twelfth batch, the sulfuric acid aqueous solution in an amount of BV3 per one batch is fed to the six columns in series.

Elution Zone

To elute Sb and Bi from the chelate resin after being washed with sulfuric acid, the eluent is fed to the six columns coupled in series. The way to feed the eluent is similar to that in the sulfuric acid washing zone. For example, after sulfuric acid washing has been performed from the seventh batch to the twelfth batch, the eluent in an amount of BV3 per one batch is fed to the six columns in series, from the thirteenth batch to the eighteenth batch.

Water Washing Zone

To wash the chelate resin after elution, water is fed to the six columns coupled in series to wash them. The way of feeding water is similar to that in the sulfuric acid washing zone. For example, after elution has been performed from the twelfth batch to the eighteenth batch, water in an amount of BV3 per one batch is fed to the six columns in series from the nineteenth batch to the twenty fourth batch. FIG. 3 shows the condition where the first column has completed the water washing process over the six batches.

Therefore, in the process shown in FIG. 3, twenty four batches are one cycle. With this method, in the first cycle, columns which have insufficient feed quantity appear in each process. However from the second cycle, there is the predetermined feed quantity.

To make up the insufficient quantity in the first cycle, the following is possible. That is to say, prior to the above first process, solution is supplied from the first column and the predetermined amount is discharged from the first column. Then, the solution is supplied again to the first column and the predetermined amount is discharged from the second column. Then, as described above, the solution is supplied to the first column and the predetermined amount is discharged from the third column. This method is executed until there is discharge from the sixth column. After this, the six columns are changed over as one set. With this method, the problem of the insufficient liquid quantity at the time of starting feed can be solved. However, with this operation, since this becomes a continuous operation over a long time, then as with the previous example, operationally there is no need to worry about insufficient feed for the first cycle.

As shown with this method, Sb and Bi can be recovered always continuously, by dividing the resin quantity required for the processing of Sb and Bi into a predetermined number of columns for each process. Moreover, it has been found that elution can be sufficiently performed only by arranging the divided columns in series and feeding a low concentration eluent to the columns in series, thereby increasing the concentration of Sb and Bi in the eluate after elution. With this method, the total quantity of the eluent can be decreased.

Furthermore, it was found that with the solution remaining in each column after completion of washing with sulfuric acid, elution and washing with water, there was no problem in using this as a replenisher for the next cycle.

Moreover, it is construed that with increase of the concentration of Sb and Bi in the eluent, the electric current efficiency in the recovery process by means of electrolytic winning increases, so that the electrolytic cost can also be reduced.

As described above, with the present invention, the chelate resin in an amount required for removal of Sb and Bi in the copper electrolyte is divided into a number of columns required for effective operation in each process of adsorption, washing with sulfuric acid, elution and washing with water and then arranged, and in the adsorption process, the copper electrolyte is supplied to each column in parallel.

In the operation of washing with sulfuric acid, elution and washing with water, feeding is preformed with the predetermined number of columns coupled in series. In this case, in each process the feed quantity required for one column can be divided into respective predetermined numbers, and the feeding operation for the divided liquid quantity can be performed as one batch continuously through each process, by shifting one column each for one batch to the downstream side, while keeping the predetermined number constant in each batch.

With the present invention however, this does not mean that the predetermined number has only to be increased in each process, and in the sulfuric acid washing process and the elution process, if a solution is fed which does not contain $H^+$ required for substituting for Cu, Sb and Bi adsorbed into the resin, elution cannot be performed, and also in the washing process, if a solution is fed which has a concentration similar to that of the solution in the column, washing cannot be performed. Hence, it is necessary to ascertain the optimum number of columns in series. Therefore, it is desirable to perform washing and elution efficiently, to increase the concentration of the eluate, and to clarify the predetermined number capable of decreasing the processing solution.

Accordingly, with the present invention, when a plurality of columns are used to perform the above described method, an optimum predetermined number for performing each process simultaneously and efficiently is found.

With another embodiment of the present invention, each process of adsorption, washing with sulfuric acid, elution, and washing with water are designated as one cycle, and a predetermined number of columns is made different for each process. That is to say, 8 in the adsorption process, 3 in the sulfuric acid washing process, 7 in the elution process, and 6 in the water washing process are used respectively, the total number of columns in the whole process being 24. In the adsorption process, conductive electrolyte is fed in parallel to the columns, and in the washing process, each processing solvent is fed in series.

While each predetermined number of columns are kept constant, each column is sequentially moved relatively toward the downstream side of the process for each batch (in the direction from adsorption→sulfuric acid washing→elution→washing with water). The processing time for each batch is designated as 1 hour, the column and the supply/discharge apparatus are relatively changed over each 1 hour, and one cycle is 24 hours. Further examples are explained hereinafter.

EXAMPLE 7

As shown in FIG. 2, ten columns were used to perform washing with sulfuric acid. First, in the adsorption process on the upstream side of the sulfuric acid washing process, 100 ml of chelate resin (produced by Rohm and Haas; product name: Duolite C-467) was filled into each column, and 10 liter of copper electrolyte was fed to each column, so that Sb and Bi were adsorbed by the above chelate resin. The copper electrolyte used contained Cu in an amount of 50 g/liter, sulfuric acid in an amount of 200 g/liter, Sb in an amount of 0.4 g/liter and Bi in an amount of 0.4 g/liter. The adsorption condition was such that the adsorption temperature was 60° C. and feeding was performed up to BV100 at a feed rate of SV10.

Then, the sulfuric acid washing of the above copper electrolyte was performed in such a manner that three columns were designated as one set, and 200 g/liter of the sulfuric acid solution at 50° C. was fed in series to the one set. The feed quantity required per one column was BV15.

First, as a preliminary batch for washing, the sulfuric acid solution was fed from the first column up to BV5 at a feed rate of SV5, and discharged from the bottom of the first column. Thereafter, all the columns were moved toward the downstream side process by one column, and the supply/discharge apparatus was changed over with respect to the column train, and the solution was fed from the top of the first column and discharged from the bottom of the second column.

Moreover, in the first batch, the columns were moved similarly, and the supply/discharge apparatus was changed over with respect to the column train, and the solution was fed from the top of the first column and discharged from the bottom of the third column. Thereafter, in the second batch, all the columns were moved toward the downstream side process by one column, and the supply/discharge apparatus was changed over with respect to the column train, and the solution was fed from the top of the second column and discharged from the bottom of the fourth column. In a similar manner for subsequent batches, the supply/discharge apparatus was changed over with respect to the column train, and in the tenth batch, supply was completed up to the tenth column.

When the resin quantity is 1 liter with a normal single column, and assuming that the required feed quantity is BV15, then the total liquid quantity becomes 15 liters. On the other hand, as in this embodiment, when the columns are divided into 10, the resin quantity per one liter becomes 100 ml, and the total liquid quantity per one column with BV15 becomes 1.5 liters (15 liters/10=1.5).

Moreover, the total BV in each process in the case where the columns are divided and the solution is fed in series to columns arranged in a predetermined number, can be calculated from the following equation:

Total BV=required feed BV/predetermined number×(total number of columns+predetermined number−1)

For example, as in this embodiment, when the columns are divided into 10 columns, and three columns are fed at a time in series, the liquid quantity decided by dividing the required feed quantity BV15 by 3, that is BV5, is required for being fed to each column. If numerical values are applied thereto, the result is as follows.

Total BV=15/3×(10+3−1)=60

Therefore, the total liquid quantity required in the whole process in this case is 100 ml×60 giving 6 liters, and it can be understood that even if the total resin quantity is the same, the total liquid quantity decreases.

Figure 4:
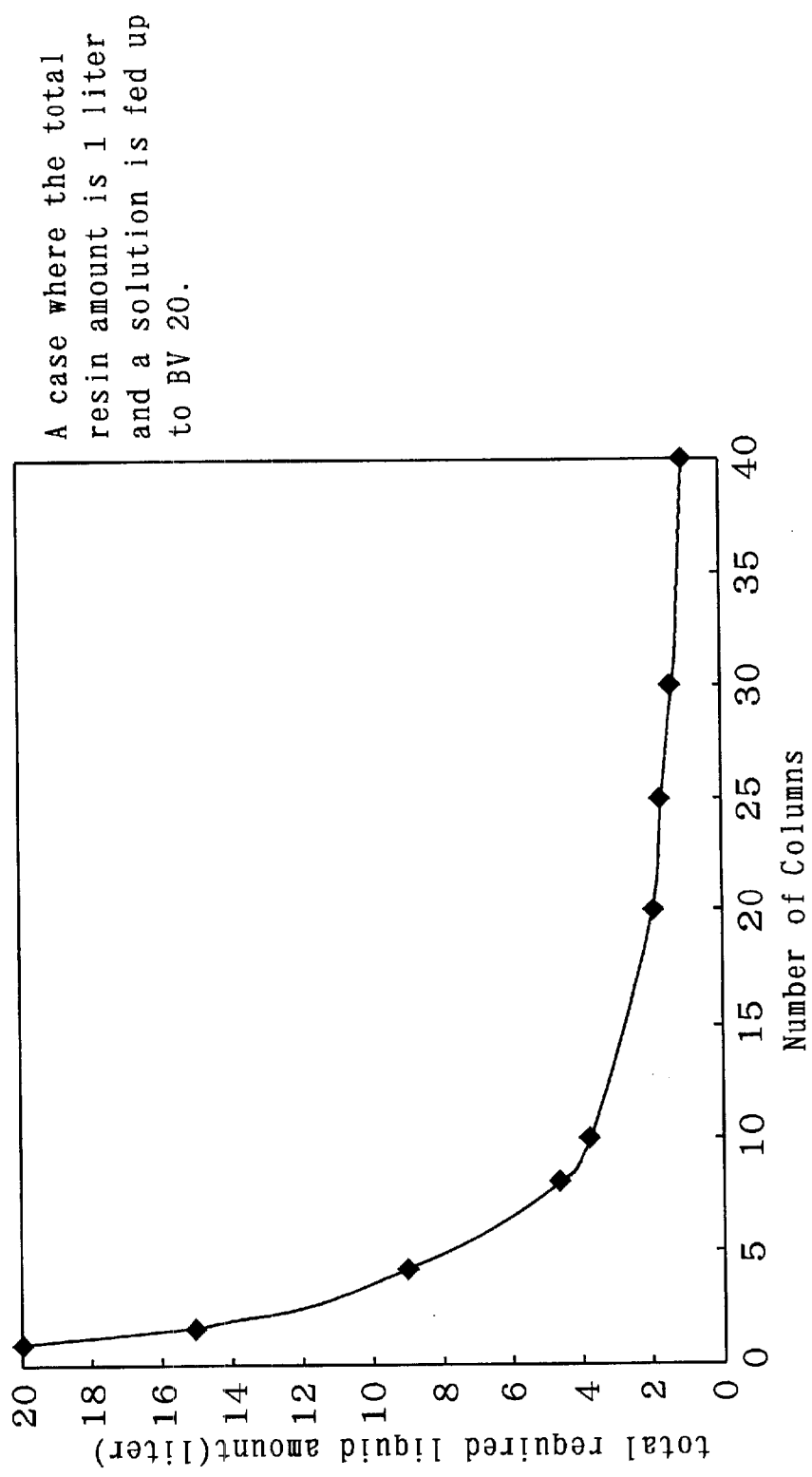
FIG. 4 is a graph showing a relation between the total number of columns coupled in series and the total liquid quantity as calculated for a case where the total resin quantity is 1 liter and a solution is fed up to BV20.

FIG. 4 shows a relation between a predetermined number (in this case, the predetermined number is the same as the total column number) and total liquid quantity as calculated from the above described calculation formula, for the case where the total resin quantity is 1 liter and the solution is fed up to BV20. As the predetermined number increases, the liquid quantity decreases, and it is seen that in the case where 10 columns are coupled in series, the liquid quantity decreases to about ⅕, and when 20 columns are coupled in series, to about 1/10.

In Example 7, the description was for washing with sulfuric acid, however in the processes of elution and washing with water this is similar.

EXAMPLE 8

Twenty one columns were used, and 100 ml of chelate resin was filled into each column, and copper electrolyte was fed to each column in parallel, so that Sb and Bi were adsorbed by the above chelate resin in all columns. The used chelate resin and copper electrolyte were the same as in Example 7. The adsorption conditions were such that the adsorption temperature was 60° C. and feeding was performed up to BV200 at a feed rate of SV20.

In the processes of washing with sulfuric acid, elution and washing with water, ten columns were coupled in series, and the required feed quantity per one column was set to be BV21 at a feed rate of SV2.1.

In each process, in the first batch, feeding was performed from the first column up to BV2.1, and the solution was discharged from the tenth column. That is to say, the supply apparatus was connected to the first column and the discharge apparatus was connected to the tenth column. Then in the second batch, feeding was performed from the second column up to BV2.1, and the solution was discharged from the eleventh column. That is to say, the supply apparatus was connected to the second column and the discharge apparatus was connected to the eleventh column. Then, feeding and discharge were performed in a similar manner up to the twenty first batch.

As shown in Table 8, up to the seventh batch, the remaining solution of the previous process was discharged from the discharge apparatus, but from the eighth batch to the twelfth batch, of the BV2.1 discharged from the discharge apparatus, that is to say from the last column in the column train coupled in series, the first BV1 is the remaining solution of the previous process. Therefore, from the eighth batch to the twelfth batch, the solution of each process was separated and recovered, and the remaining BV1.1 was designated as the solution in each process. From the thirteenth batch, since there was no remaining solution of the column, BV2.1 was designated as the solution in each process.

TABLE 8

| Batch | Column to be supplied | Column to be discharged | BV | Column having interface | Discharged BV | Preprocessing solution of discharge BV |
|---|---|---|---|---|---|---|
| 1 | 1 | 10 | 2.1 | 3 | 2.3 | 2.3 |
| 2 | 2 | 11 | 4.2 | 5 | 4.6 | 4.6 |
| 3 | 3 | 12 | 6.3 | 7 | 6.9 | 6.9 |
| 4 | 4 | 13 | 8.4 | 10 | 9.2 | 9.2 |
| 5 | 5 | 14 | 10.5 | 12 | 11.5 | 11.5 |
| 6 | 6 | 15 | 12.6 | 14 | 13.8 | 13.8 |
| 7 | 7 | 16 | 14.7 | 16 | 16.0 | 16.0 |
| 8 | 8 | 17 | 16.8 | 17 | 18.1 | 17.0 |
| 9 | 9 | 18 | 18.9 | 18 | 20.2 | 18.0 |
| 10 | 10 | 19 | 21.0 | 19 | 22.3 | 19.0 |
| 11 | 11 | 20 | 23.1 | 20 | 24.4 | 20.0 |
| 12 | 12 | 21 | 25.2 | 21 | 26.5 | 21.0 |
| 13 | 13 | 1 | 27.3 | — | 28.6 | — |
| 14 | 14 | 2 | 29.4 | — | 30.7 | — |

In the process of washing with sulfuric acid, a 200 g/l sulfuric acid aqueous solution at about 50° C. was used. At this time, to prevent the electrolyte remaining in the column and the sulfuric acid aqueous solution from mixing, the sulfuric acid aqueous solution was fed from the top of the column to push down the electrolyte by utilizing the difference in specific gravity, to thereby effect washing.

The elution process was started at the time of completion of the tenth batch in the sulfuric acid washing, and a mixture solution of 2.5 moles each of sulfuric acid and sodium chloride at about 50° C. was used. Also at this time, to prevent the sulfuric acid remaining in the column and the mixture solution from mixing, the mixture solution was fed from the bottom of the column to push up the sulfuric acid aqueous solution by utilizing the difference in specific gravity, to thereby effect elution.

The washing process was started at the time of completion of the tenth batch in the elution process, and warm water at about 50° C. was used. Also at this time, to prevent the eluent remaining in the column and the warm water from mixing, warm water was fed from the top of the column until to push down the eluate after elution by utilizing the difference in specific gravity, to thereby effect washing.

Comparative Example 5

By using the same single column filled with 2.1 liter of chelate resin similar to that of Example 8, a similar copper electrolyte was fed at 60° C. at a feed rate of SV20 up to BV200. Then, in the sulfuric acid washing, elution and water washing processes, solutions similar to those of Example 7 were fed at about 50° C. at a feed rate of SV3 up to BV21, respectively. Only in the elution process, the solution was fed from the bottom of the column, and in the other processes, the solution was fed from the top of the column.

Table 9 shows the difference in the liquid quantity in the continuous column method of the present invention (Example 8) and the single column method (Comparative Example 5).

TABLE 9

| (Comparative Example 5) Single column method | | (Example 8) Continuous column method | | | |
|---|---|---|---|---|---|
| | | | | Supply/discharge column No. | |
| | Liquid quantity | | Liquid quantity | | |
| BV | (l) | BV | (l) | Supply | Discharge |
| 0 | 0 | 0 | 0 | | |
| 1.0 | 2.1 | 2.1 | 0.21 | 1 | 10 |
| 2.0 | 4.2 | 4.2 | 0.42 | 2 | 11 |
| 3.0 | 6.3 | 6.3 | 0.63 | 3 | 12 |
| 4.0 | 8.4 | 8.4 | 0.84 | 4 | 13 |
| 5.0 | 10.5 | 10.5 | 1.05 | 5 | 14 |
| 6.0 | 12.6 | 12.6 | 1.26 | 6 | 15 |
| 7.0 | 14.7 | 14.7 | 1.47 | 7 | 16 |
| 8.0 | 16.8 | 16.8 | 1.68 | 8 | 17 |
| 9.0 | 18.9 | 18.9 | 1.89 | 9 | 18 |
| 10.0 | 21.0 | 21.0 | 2.10 | 10 | 19 |
| 11.0 | 23.1 | 23.1 | 2.31 | 11 | 20 |
| 12.0 | 25.2 | 25.2 | 2.52 | 12 | 21 |
| 13.0 | 27.3 | 27.3 | 2.73 | 13 | 1 |
| 14.0 | 29.4 | 29.4 | 2.94 | 14 | 2 |
| 15.0 | 31.5 | 31.5 | 3.15 | 15 | 3 |
| 16.0 | 33.6 | 33.6 | 3.36 | 16 | 4 |
| 17.0 | 35.7 | 35.7 | 3.57 | 17 | 5 |
| 18.0 | 37.8 | 37.8 | 3.78 | 18 | 6 |
| 19.0 | 39.9 | 39.9 | 3.99 | 19 | 7 |
| 20.0 | 42.0 | 42 | 4.20 | 20 | 8 |
| 21.0 | 44.1 | 44.1 | 4.41 | 21 | 9 |

In the comparative example, in order to feed twenty one columns up to BV21, 44.1 liters (2.1 liters×21) of feed quantity was necessary. However, in Example 8, it is seen that the liquid quantity can be managed with 4.41 liters which is 1/10 of the liquid quantity required in the comparative example.

In addition, according to the formula of total BV=required feed BV/predetermined number×(total number of columns+ predetermined number−1), in Example 8, since the columns are divided into 21, and 10 columns are fed one at a time in series, the liquid quantity obtained by dividing the required feed quantity BV21 by 10, that is, BV2.1 is required for being fed to each column. If numerical values are applied thereto, the result is as follows.

Total BV=21/10×(21+10−1)=63

Therefore, the total liquid quantity required in the whole process in this case is 100 ml×63 giving 6.3 liters, and it can be understood that even if the total resin quantity is the same, the total liquid quantity decreases.

Figure 5:
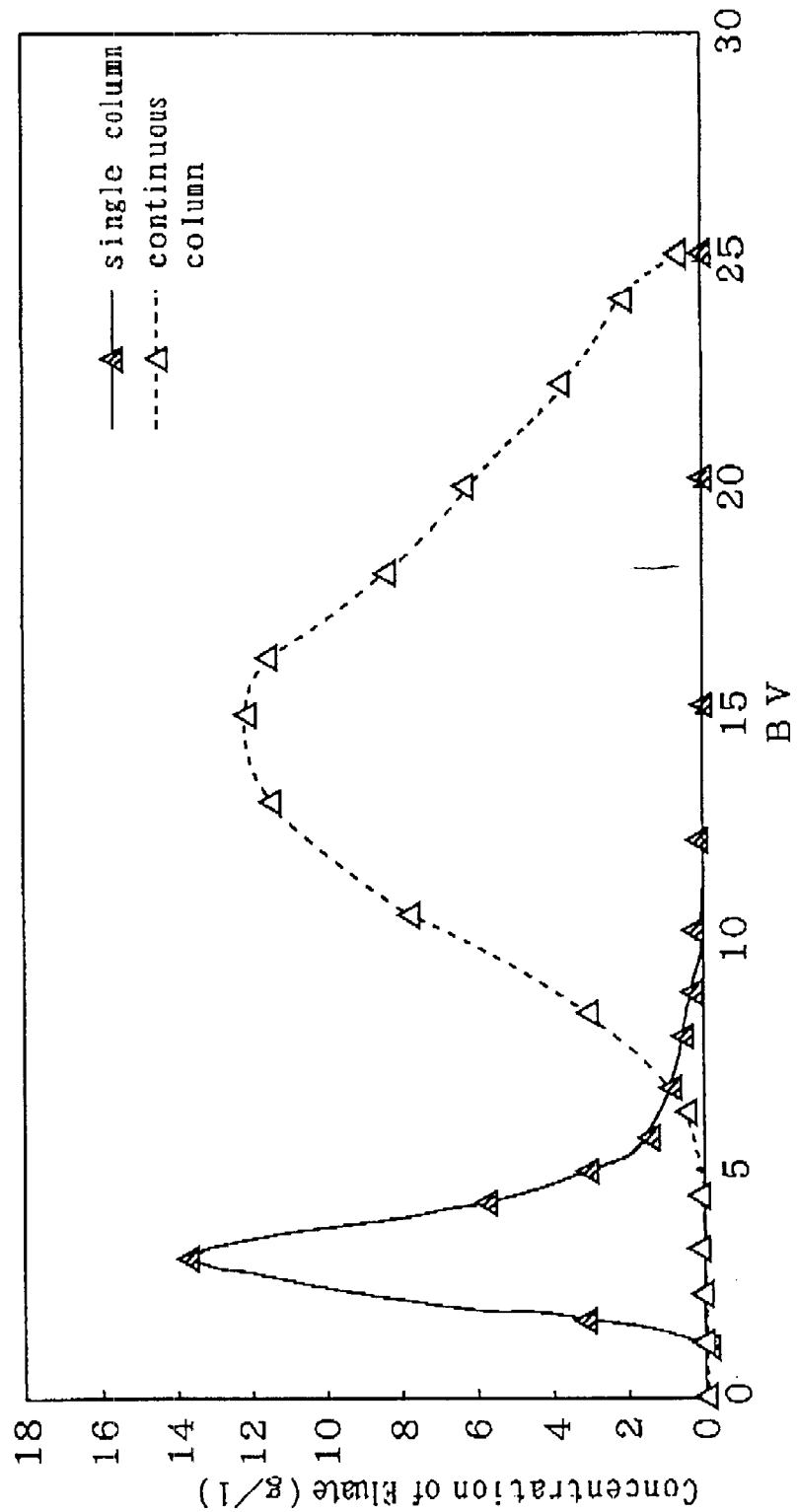
FIG. 5 is Sb elution curves for a single column method and a continuous column method.
Figure 6:
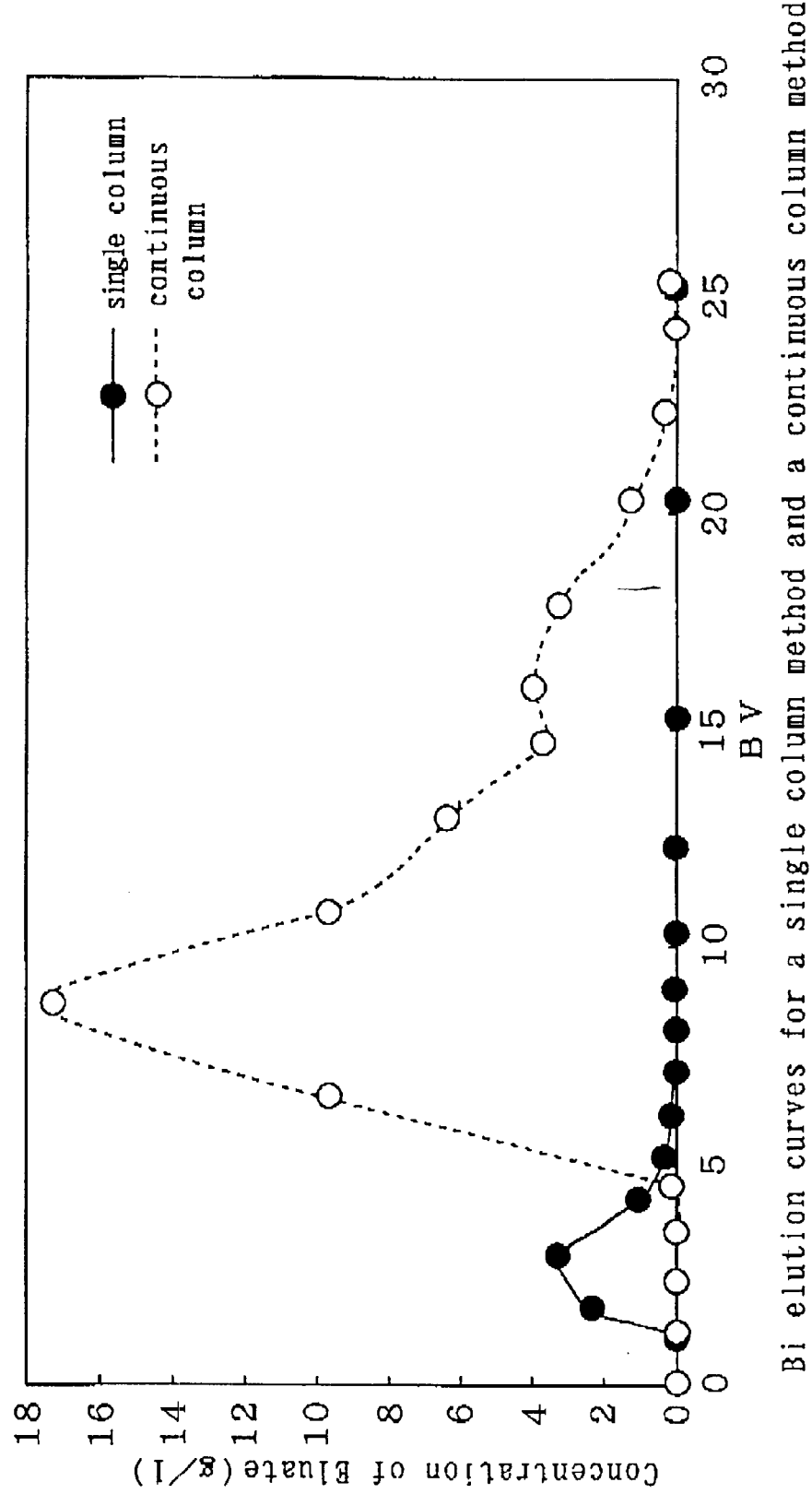
FIG. 6 is Bi elution curves for a single column method and a continuous column method.

FIG. 5 and FIG. 6 show an elution curve in the single column method and in the continuous column method of the present invention. From these figures, it is seen that the liquid quantity is reduced and high concentration solution can be obtained, by dividing a column into small columns and feeding a solution in series. In the examples of the present invention, since the data for one cycle is shown, the liquid concentration at the time or completion of the elution process becomes low. However actually since the cycle becomes endless, a high concentration solution is always discharged.

As described above, according to the present invention, it is understood that the liquid quantity to be used can be decreased, and further a high concentration eluate can be obtained. Moreover, as the number of columns coupled in series increases, the total quantity of the processing solvent can be decreased, and a high concentration of eluate can be expected.

EXAMPLE 9

Copper electrolyte was fed in parallel to each column filled with 100 ml of chelate resin per column, so that Sb and Bi were adsorbed. The used chelate resin and copper electrolyte were the same as those in Example 7. The adsorption condition was such that the adsorption temperature was 60° C. and feeding was performed up to BV100 at a feed rate of SV10.

EXAMPLE 9-1

Then, in order to wash the above described copper electrolyte, 200 g/liter of a sulfuric acid aqueous solution at about 50° C. was fed one at a time to three to ten columns coupled in series in an amount divided by the number of columns coupled in series, while keeping the feed quantity per column constant at BV9 and BV15 (0.9 and 1.5 liters). The feed rate was at SV5, and the columns were changed for each liquid quantity to compare the amount of Cu mixed in the eluate.

EXAMPLE 9-2

In order to elute the adsorbed Sb and Bi by using a column which had completed sulfuric acid washing, a mixture solution of 2.5 moles each of sulfuric acid and sodium chloride at about 50° C. was fed one at a time to three to ten columns coupled in series in an amount divided by the number of columns coupled in series, as in Example 9-1, while keeping the feed quantity per column constant at BV15 and BV21 (1.5 and 2.1 liters). The feed rate was at SV5, and the columns were changed for each liquid quantity to compare the concentration of Sb and Bi In the eluate.

EXAMPLE 9-3

In order to wash the columns by using a column which had completed elution, warm water at about 50° C. was fed one at a time to three to ten columns coupled in series in an amount divided by the number of columns coupled in series, as in Example 9-1, while keeping the feed quantity per column constant at BV15 and BV21 (1.5 and 2.1 liters). The feed rate was at SV5, and columns were changed for each liquid quantity to compare the final concentration of Cl in the eluate.

Table 10 shows the number of columns coupled in series and concentration of respective solutions.

TABLE 10

| | Washing with sulfuric acid | |
|---|---|---|
| Number of | Concentration of copper in eluate (g/l) | |
| Columns | BV9 | BV15 |
| 3 | 0.26 | 0.13 |
| 5 | 0.33 | 0.26 |
| 7 | 0.49 | 0.38 |
| 10 | — | 0.53 |

| | Elution | | | |
|---|---|---|---|---|
| Number of | Feed up to BV 15 | | Feed up to BV 21 | |
| Column | Sb g/l | Bi g/l | Sb g/l | Bi g/l |
| 3 | — | — | 3.90 | 1.53 |
| 5 | 8.11 | 4.48 | 5.89 | 2.80 |
| 7 | 9.88 | 6.27 | 7.52 | 4.22 |
| 10 | — | — | 7.15 | 6.04 |

TABLE 10-continued

| | Washing with water after elution | |
|---|---|---|
| Number of Columns | BV15 Cl g/l | BV21 Cl g/l |
| 3 | 3.90 | 3.90 |
| 5 | 5.89 | 5.89 |
| 7 | 7.52 | 7.52 |
| 10 | 7.15 | 7.15 |

In the washing with sulfuric acid, when three columns are coupled in series and changed for every BV5, then with the total BV15 the Cu concentration in the eluate can be made to be about 0.1 g/l.

In the elution, when ten columns are coupled in series and changed for every BV2.1, then with the total BV21 the concentration becomes the highest and elution can be easily performed.

In washing with water after elution, when ten columns are coupled in series and changed for every BV2.1, then with the total BV21 the final Cl concentration can be made substantially the same as that of tie copper electrolyte. It is seen that with the method in the above examples, even if the total resin quantity is the same, an eluate of high concentration can be obtained, and the amount of washing water after elution can be reduced.

However, in the elution process, with the number of columns coupled in series, there is not much difference between seven and ten columns, and this is also the limit in washing with water after elution. Moreover, when the number of columns is large, there is a problem in that when the columns are changed under automatic control, the number of solenoid valves must increased. Therefore, the number of columns cannot be simply increased.

The optimum number in the present invention is twenty three excluding the adsorption process. Hence considering a 24 hour cycle, there is a surplus. The feed quantity BV in the adsorption process is required to be about BV150 to BV200, and considering an SV of about SV20, then about eight columns are necessary.

Figure 7:
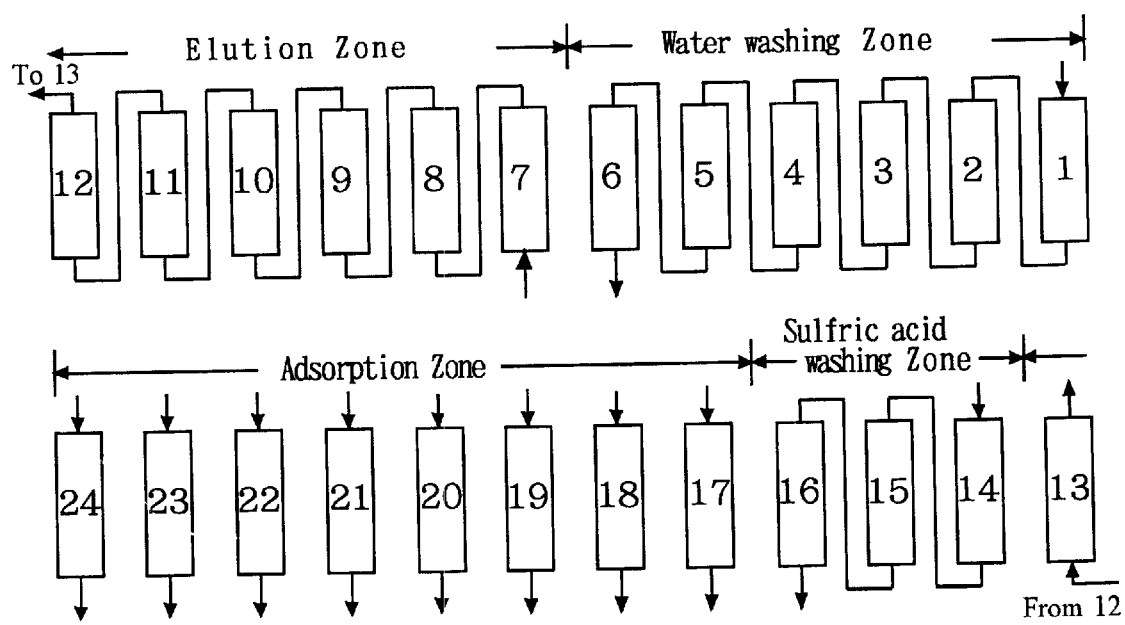
FIG. 7 is a schema showing an example of the optimum number of columns in the present invention.

Therefore, in order to efficiently perform each process simultaneously, eight columns are optimum in the adsorption process, three in the sulfuric acid washing process, seven in the elution process, and six in the water washing process after elution. FIG. 7 shows the optimum number in a schema.

With the continuous solution purification method for an electrolyte by means of a chelate resin according to the examples of the present invention as mentioned above, even if the total resin quantity is the same, by feeding a solution to divided small columns, a high concentration eluate can be obtained with small liquid quantity. Moreover, by feeding to a necessary number or a plurality of columns in the processes of adsorption, elution and the like, respective processes can be performed simultaneously, and Sb and Bi can be recovered continuously at all times. Furthermore, the solution of the previous process remaining in the column after completion of elution or washing with water can be used as a replenisher for the next cycle. Hence the quantity of newly replenished processing solution can be also economized.

What is claimed:

1. A solution purification method for an electrolyte comprising the steps of dividing a chelate resin having a volume corresponding to the quantity of substances to be adsorbed into a plurality of columns, bringing an electrolyte into contact with the chelate resin in the columns to adsorb the substances for removing, respectively, and subjecting a predetermined number of columns which have completed adsorption among the plurality of columns, to washing in turn, such that the columns are fed in series with a washing solution wherein the electrolyte contains copper, and the substances to be removed from the electrolyte are Sb and Bi.

2. The solution purification method of claim 1, wherein in the washing step, washing with sulfuric acid, elution and washing with water are preformed.

3. The solution purification method of claim 1 wherein the adsorbing step is provided on the upstream side while the washing step is provided on the lower stream side, and in the adsorption step on the upstream side, a predetermined number of columns are grouped, and at the point in time after a liquid quantity obtained by dividing the feed quantity required for adsorption per column by the predetermined number, has been fed into each column, the columns are moved to the washing step on the downstream side.

4. The solution purification method of claim 1, wherein in this adsorption step, the liquid quantity obtained by dividing the feed quantity required for adsorption per one column by the predetermined number, is fed in parallel to each column.

5. The solution purification method of claim 1, wherein each column is positioned in the adsorption step sequentially over a number of batches equivalent to the predetermined number, and the liquid quantity obtained by dividing the feed quantity required for adsorption per one column by the predetermined number, is fed for each batch.

6. The solution purification method of claim 1, wherein when respective steps of washing with sulfuric acid, elution and washing with water are performed from the upstream side toward the downstream side, then in each step, the feed quantity required for one column is divided by the predetermined number, and at the time of having fed the divided feed quantities to each column in series, the columns are moved sequentially toward the downstream side.

7. The solution purification method of claim 1, wherein at least two columns which have completed the adsorption process are first arranged in series in a required number, a sulfuric acid washing solution is fed to these columns in series, and the columns to be fed are moved toward the downstream side and changed over, while keeping the total number of columns constant.

8. The solution purification method of claim 1, wherein at least two columns which have completed washing with sulfuric acid are arranged in series in a required number, eluent is fed to these columns in series, and the columns to be fed are moved toward the downstream side and changed over, while keeping the total number of columns constant.

9. The solution purification method of claim 1, wherein at least two columns which have completed the elution step are arranged in series in a required number, a washing solution is fed to these columns in series, and the columns to be fed are moved toward the downstream side and changed over, while keeping the total number of columns constant.

10. The solution purification method of claim 1, wherein a number of columns required for each step of adsorption, washing with sulfuric acid, elution and washing with water are arranged in series, and a necessary amount of resin is divided into a plurality of columns to thereby perform the steps simultaneously, designating the time when the first column has completed all processes as one cycle.

11. The solution purification method of claim 1, wherein in the elution and washing steps, of the liquid discharged from the columns after being fed, a solution from a previous step remaining in the column is utilized as a replenisher for the next cycle.

* * * * *

UNITED STATES PATENT AND TRADEMARK OFFICE
CERTIFICATE OF CORRECTION

PATENT NO. : 6,340,427 B1
DATED : January 22, 2002
INVENTOR(S) : Atsushi Fukui, Kouji Ando and Masaki Imamura It is certified that error appears in the above-identified patent and that said Letters Patent is hereby corrected as shown below:

<u>Column 20,</u>
Line 10, "preformed" should read -- performed --.

Signed and Sealed this

Seventh Day of May, 2002

*Attest:*

*Attesting Officer*

JAMES E. ROGAN
*Director of the United States Patent and Trademark Office*